United States Patent
Ji et al.

(10) Patent No.: US 11,133,760 B2
(45) Date of Patent: Sep. 28, 2021

(54) METHOD FOR CONTROLLING COMPRESSOR BRAKING, FREQUENCY CONVERTER AND VARIABLE SPEED COMPRESSOR

(71) Applicant: Danfoss (Tianjin) Ltd., Tianjin (CN)

(72) Inventors: Shizhong Ji, Tianjin (CN); Li Yao, Tianjin (CN); Yingke Sun, Tianjin (CN); Qingyue Meng, Tianjin (CN)

(73) Assignee: Danfoss (Tianjin) Ltd., Tianjin (CN)

( * ) Notice: Subject to any disclaimer, the term of this patent is extended or adjusted under 35 U.S.C. 154(b) by 0 days.

(21) Appl. No.: 16/701,516

(22) Filed: Dec. 3, 2019

(65) Prior Publication Data

US 2020/0186057 A1    Jun. 11, 2020

(30) Foreign Application Priority Data

Dec. 4, 2018 (CN) .......................... 201811483697.7

(51) Int. Cl.
*H02P 3/12*    (2006.01)
*F25B 49/02*   (2006.01)

(52) U.S. Cl.
CPC .............. *H02P 3/12* (2013.01); *F25B 49/022* (2013.01); *F25B 49/025* (2013.01); *F25B 2600/021* (2013.01); *F25B 2600/024* (2013.01)

(58) Field of Classification Search
CPC ...... H02P 1/00; H02P 1/04; H02P 1/46; H02P 3/00; H02P 3/16; H02P 3/18; H02P 6/00;
(Continued)

(56) References Cited

U.S. PATENT DOCUMENTS 5,782,610 A * 7/1998 Ikeda ................... F04C 18/0215
                                                        318/379
6,483,268 B1   11/2002 Cummins
(Continued)

FOREIGN PATENT DOCUMENTS

| CN | 102332838 A | 1/2012 |
|---|---|---|
| CN | 105656370 A | 6/2016 |
| CN | 105658465 A | 6/2016 |
| CN | 108138780 A | 6/2018 |
| CN | 108322100 A | 7/2018 |
| DE | 36 14 093 A1 | 11/1987 |
| DE | 10 2009 050 720 A1 | 4/2011 |

(Continued)

OTHER PUBLICATIONS

Indian First Examination Report for Application No. 201914049854 dated Nov. 5, 2020.

*Primary Examiner* — Antony M Paul
(74) *Attorney, Agent, or Firm* — McCormick, Paulding & Huber PLLC (57) ABSTRACT

Embodiments of the present invention provide a method for controlling compressor braking, a frequency converter and a variable speed compressor. The method includes steps of: determining to brake a compressor, wherein a brake circuit includes three switching units and the three switching units are respectively electrically connected to three phases of windings of a motor of the compressor; actuating two of the three switching units to short-circuit two phases of windings of the motor. The two phases of windings of the motor are short-circuited by controlling the three switching units to generate braking torque, such that the compressor is braked without introducing a DC voltage, and thus the braking energy consumption is reduced. Besides, by turning on only two switches at a time, the switching abrasion is reduced, and the overall service life of the three switching units is effectively improved.

18 Claims, 7 Drawing Sheets

(58) Field of Classification Search
CPC .. H02P 5/00; H02P 21/00; H02P 23/00; H02P 25/00; H02P 27/00; H02P 27/04; H02P 27/06; H02P 3/12; H02P 3/22; F25B 49/025; F25B 49/022; F25B 2600/024; F25B 2600/021
See application file for complete search history.

(56) References Cited

U.S. PATENT DOCUMENTS

| | | | |
|---|---|---|---|
| 8,424,347 B2* | 4/2013 | Maekawa | D06F 33/00 68/12.16 |
| 8,988,028 B2* | 3/2015 | Foye | H02P 29/0241 318/400.34 |
| 10,801,759 B2* | 10/2020 | Beckmann | F25B 31/02 |
| 2017/0373619 A1 | 12/2017 | Ryba et al. | |

FOREIGN PATENT DOCUMENTS

| | | |
|---|---|---|
| DE | 10 2016 204 854 A1 | 9/2017 |
| DE | 10 2016 207 493 A1 | 11/2017 |
| EP | 0 742 637 A1 | 11/1996 |
| JP | 2000-069760 A | 3/2000 |
| JP | 2004-359200 A | 12/2004 |
| KR | 10-0941217 B1 | 2/2010 |
| WO | 2017152573 A1 | 9/2017 |

* cited by examiner

METHOD FOR CONTROLLING COMPRESSOR BRAKING, FREQUENCY CONVERTER AND VARIABLE SPEED COMPRESSOR

CROSS-REFERENCE TO RELATED APPLICATION

This application claims foreign priority benefits under 35 U.S.C. § 119 to Chinese Patent Application No. 201811483697.7 filed on Dec. 4, 2018, the content of which is hereby incorporated by reference in its entirety.

TECHNICAL FIELD

The present invention relates to the field of compressors, and more particularly to a method for controlling compressor braking, a frequency converter, and a variable speed compressor.

BACKGROUND

During the braking process of a compressor, a Direct Current (DC) braking is often used. In the DC braking, DC voltage is applied to the stator of a motor, and output frequency of the frequency converter is zero at this moment, and the stator generates a static constant magnetic field, and the rotating rotor cuts the magnetic field and produces a braking torque forcing the rotor of the motor to stop quickly. Consequently, kinetic energy stored in the motor is converted into electrical energy and is consumed. However, the DC braking has a disadvantage that DC power source is required to introduce DC voltage into the motor, which increases the overall energy consumption. Besides, the sudden shift-in of the DC voltage will cause vibration of the compressor, which is harmful for the compressor.

SUMMARY

In view of this, embodiments of the present invention provide a solution for controlling the compressor braking. Motor windings of a compressor are short-circuited to achieve the braking, which solves problems in the DC braking, such as the DC braking requires additional introduction of DC current and thus has higher energy consumption, and the problem of compressor vibration caused by the sudden shift-in of DC current.

According to an aspect of the present invention, an embodiment of the present invention provides a method for controlling compressor braking, comprising: determining to brake a compressor, wherein the brake circuit includes three switching units that are electrically connected to three-phase windings of a motor of the compressor, respectively; actuating two of the three switching units to short-circuit two phases of windings of the motor.

In an embodiment, the two switching units actuated in each turn are cyclically alternated among the three switching units.

In an embodiment, the cyclically alternating the two switching units actuated in each turn for generating brake torque among the three switching units includes: cyclically controlling two switching units of the three switching units to operate in accordance to a preset time period.

In an embodiment, the three switching units comprise three phase bridge arms, each phase of bridge arm comprises two switches in series, said three phases of bridge arms are connected with the three phases of windings of the motor at three connection points which are respectively disposed between the two switches of said each phase of bridge arm; wherein, the actuating two of the three switching units comprises: turning on two switches of the three switching units, the two switches being at the same side of the three connection points, wherein the other switches being remained off.

In an embodiment, the three switching units comprise three phases of bridge arms, each phase of bridge arm comprises a single-pole double-throw switch, and a movable terminal of the single-pole double-throw switch is connected to a phase of windings of the motor, and two fixed terminals of said single-pole double-throw switch are located at both sides of the movable terminal; wherein, the actuating two of the three switching units comprises: electrically connecting two respective movable terminals of two single-pole double-throw switches among three single-pole double-throw switches respectively with two fixed terminals at the same side of the two movable terminals, wherein a movable terminal of the other single-pole double-throw switch maintains disconnected from a fixed terminal at the same side as the two fixed terminals connected with the two movable terminals.

In an embodiment, the actuating two of the three switching units comprises: controlling the "on" time and "off" time of the switches in the two switching units with a pulse width signal.

In an embodiment, the method further includes: determining that the rotational speed of the motor is less than the preset rotational speed before determining to brake the compressor.

In an embodiment, the method further includes: determining that a current of the motor is less than a preset current before determining to brake the compressor.

In an embodiment, the method further includes: before determining that the current of the motor is less than the preset current, determining that a speed of the motor is lower than a preset speed.

In an embodiment, the method further includes: turning off the three switching units when the current of the motor is greater than or equal to the preset current.

According to another aspect, a frequency converter includes: a brake circuit comprising three switching units electrically connected to three phases of windings of a motor of a compressor; and a controller, configured to implement the method of any of claims 1-10.

According to another aspect, a variable speed compressor includes:

a permanent magnet motor, and the frequency converter, wherein the brake circuit in said frequency converter is coupled to said permanent magnet motor for implementing control of the motor.

According to another aspect, a computer readable storage medium is provided, in which a computer program is stored. When the computer program is executed by a processor, the steps of the above method are performed.

The compressor braking mechanism according to the embodiments of the invention generates braking torque by short-circuiting two phases of windings of the motor of the compressor through the actuation of two of the three switching units, and achieves the compressor braking without introducing a DC voltage, thereby reducing energy consumption. By actuating only two switching units at a time, abrasion of the switching units during braking is reduced and the overall service life of the three switching units are effectively improved.

DETAILED DESCRIPTION

The technical solutions in the embodiments of the present invention will be described in the following with reference to the accompanying drawings. It is obvious that the described embodiments are only a part of the embodiments of the present invention, not all embodiments. All the other embodiments obtained by those skilled in the art based on the embodiments of the present invention without further inventive efforts are within the scope of the present invention.

Figure 1:
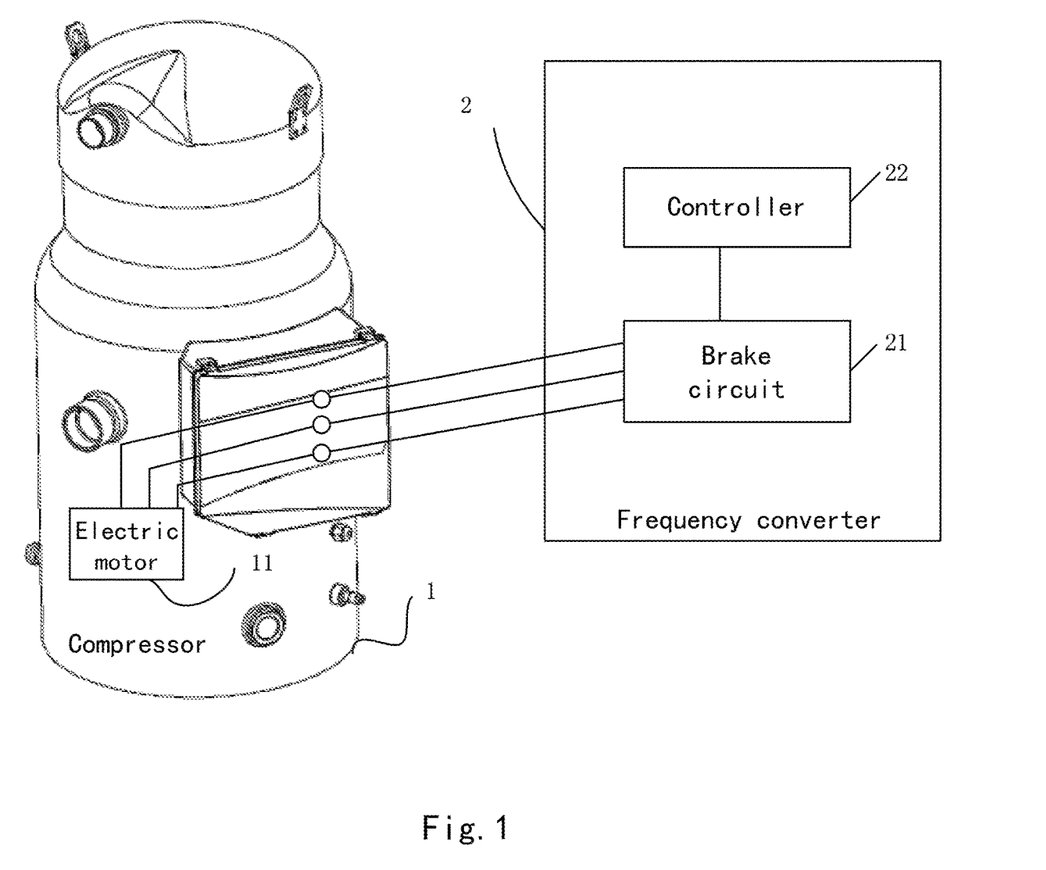
FIG. 1 is a schematic view of a variable speed compressor equipped with a frequency converter.

A compressor is a driven fluid machine that pressurizes low pressure gas to high pressure gas and is the heart of a refrigeration system. Typically, the compressor includes a variable speed compressor and a fixed speed compressor. The variable speed compressor is typically equipped with a frequency converter, and is also known as a variable frequency compressor. FIG. 1 is a schematic illustration of a variable speed compressor equipped with a frequency converter. As shown in FIG. 1, the frequency converter 2 of the variable speed compressor and the compressor 1 may be integrated or separated. In this embodiment, the frequency converter 2 is separated from the compressor 1. The frequency converter 2 controls the compressor 1, including controlling the braking of the compressor according to the embodiments of the present invention. The compressor 1 includes a motor 11 and a compression unit (not shown). The compressor 1 sucks in gas; the motor 11 operates and drives the compression unit to compress the gas sucked in and then to discharge the compressed gas, and thus provides power for the circulation of the gas. The frequency converter 2 may include a brake circuit 21 and a controller 22. The brake circuit 21 is electrically connected with the controller 22, and the brake circuit 21 is electrically connected with the motor 11. When braking the compressor 1, the brake circuit 21 and the controller 22 in the frequency converter 2 cooperate to achieve the braking of the motor 11. The braking of the compressor will be described in detail in the following embodiments.

Figure 2:
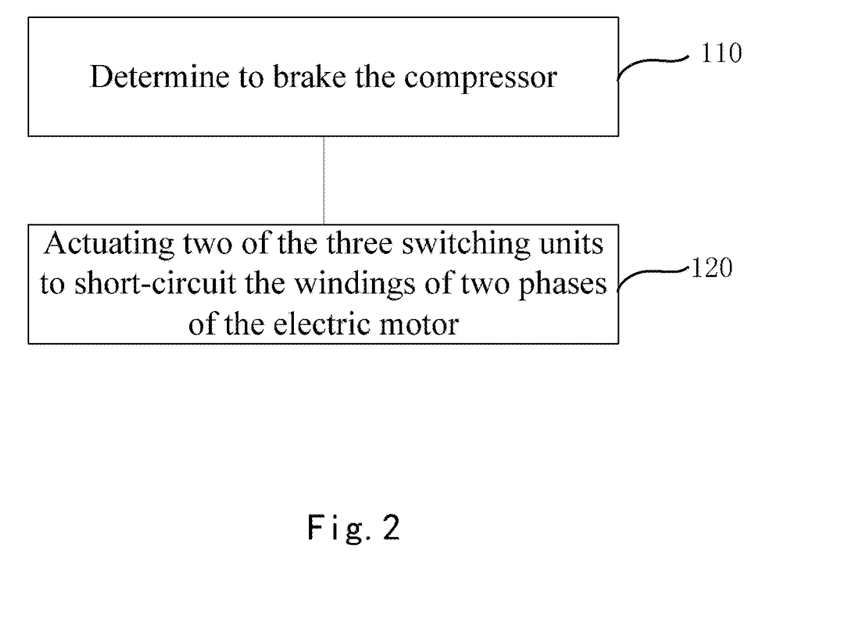
FIG. 2 is a schematic flow chart of a method for controlling compressor braking according to an embodiment of the present invention.

FIG. 2 is a schematic flow chart of a method for controlling compressor braking according to an embodiment of the present invention. The method shown in FIG. 2 can be implemented by the above described frequency converter that controls compressor braking, such as executed by the cooperation of the controller 22 and the brake circuit 21.

In Step 110, determine to brake the compressor.

In Step 120, actuate two of three switching units to short-circuit two phases of windings of the motor.

Specifically, the brake circuit 21 includes three switching units, which are respectively electrically connected to the three-phases of windings of the motor 11, and the controller 22 can control the operation of two of the three switching units to short-circuit the two phases of windings of the compressor motor 11.

The short-circuiting of the two phases of the motor will form a closed loop. The rotor of the motor will cut the magnetic field during rotation, thus electric current is generated, converting the kinetic energy of the motor rotor into electric energy, and the electric energy will be consumed through the heat generated by the internal resistance of the motor rotor. In this way, the kinetic energy of the motor rotor of is consumed and the braking is achieved.

It should be understood that the respective initial states of the three switching units before the compressor braking are "off". When braking is required, the controller actuates two of the three switching units to short-circuit the two phases of windings of the motor in order to generate a braking torque, which converts the kinetic energy of the motor into electrical energy consumed on the motor rotor so that the braking of the compressor is achieved. Only two switching units are actuated at each turn, and the abrasion of the three switching units is reduced and the overall service life of the three switching units is improved.

In an embodiment, the two switching units actuated at each turn are cyclically alternated among the three switching units. By cyclically alternating the two switching units actuated at each turn, an even distribution of the abrasion of the three switching units is achieved.

By cyclically alternating the two switching units actuated at each turn for generating the braking torque, the energy consumption generated during the braking process is equally distributed among the three switching units, and the overall service life of the three switching units is improved.

In an embodiment, after actuating two of the three switching units, it is determined whether the motor 11 ceases rotating, and if so, the cycle would be terminated, and the switching units are set to the initial state "off". Otherwise, the braking is continued until the motor 11 ceases rotating. For example, it is possible to determine whether the compressor is stopped based on the rotational speed of motor 11 detected by component detecting the rotational speed, such as a sensor configured at the motor 11. When it is determined that the motor 11 is stopped, the cycle is terminated, the switching units are set to the initial state "off". Otherwise, continue the actuation of two switching units in order to achieve braking.

In an embodiment, the three switching units may include three-phase bridge arms, each of the bridge arms may include two switches in series, and the three connection points of the three-phase bridge arms for connecting to the compressor three-phase windings are respectively disposed between the two switches of each phase of bridge arm. In this case, two switches at the same side of the three connection points are turned on, so that two phases of windings of the motor are short-circuited for generating braking torque, thereby achieving the braking of the compressor. And the two switches that are turned on at each cycle are the two switches on the same side of the three-phase bridge arms, which ensures the cyclic use of the six switches, and the abrasion is evenly distributed to the six switches so that the overall service life of the three-phase bridge arms is improved.

In an embodiment, the three switching units may include three-phases of bridge arms, each phase of the bridge arms may include a single-pole double-throw switch, and the movable terminal of each single-pole double-throw switch is connected to the three-phases of windings of the motor, and two fixed terminals at both sides of the movable terminal are configured on each phase of bridge arm. In this arrangement, the two respective movable terminals of the two single-pole double-throw switches are electrically connected respectively with the two fixed terminals at the same side of the two movable terminals, and consequently, the two phases of the windings of the motor is short-circuited. The two fixed terminals connected for generating the braking torque are cyclically alternated, the energy generated during the braking process is distributed equally to the three single-pole double-throw switches, and the overall life of the three single-pole double-throw switches are improved.

In an embodiment, a time period can be preset for cyclically actuating two of the three switching units to short-circuit two phases of windings of the motor 11.

Specifically, the controller 22 cyclically actuates two of the three switching units according to the preset time period to achieve the braking by short-circuiting two phases of windings of the motor 11, and a cyclical alternating use of the three switching units is achieved. In this way, the abrasion during the braking process is distributed as evenly as possible among the three switching units, which increases the overall life of the three switching units. It should be understood that the preset time period may be adjusted according to requirements of the actual application scenario, and the present invention does not specifically limit the preset time period.

In an embodiment, the "on" time and the "off" time of the two switching units are controlled by a pulse width signal during the actuation of two of the three switching units.

Specifically, the controller 22 controls the "on" time and the "off" time of the two switching units by using a pulse width modulation (PWM) signal, that is, alternately turning on and off the switches in the two switching units to reduce the turn-on loss of the switches. At the same time, the controller 22 can also adjust the duty ratio of the PWM signal according to factors of the motor 11 such as the heat generation or braking demand, to ensure the compressor braking effect while ensuring its service life.

It should be understood that the present invention can also choose other turn-on control methods according to the requirements of the application scenario, as long as the turn-on of the two switches can be achieved. It can be a control method alternating the on and off of the switches in the two switching units, and it can also be a control method that keeps the switches in the two switch units being on. The present invention does not limit the turn-on control methods for the switches in the two switch units selected for each cycle.

Figure 3:
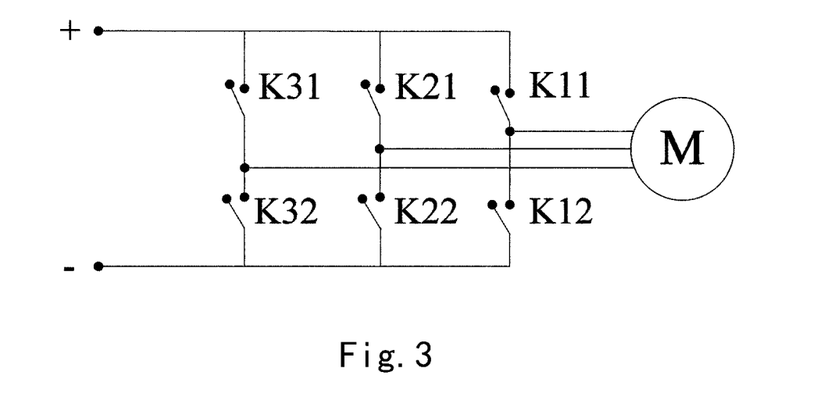
FIG. 3 is a schematic diagram showing the connection between a brake circuit and an motor according to an embodiment of the present invention.
Figure 4:
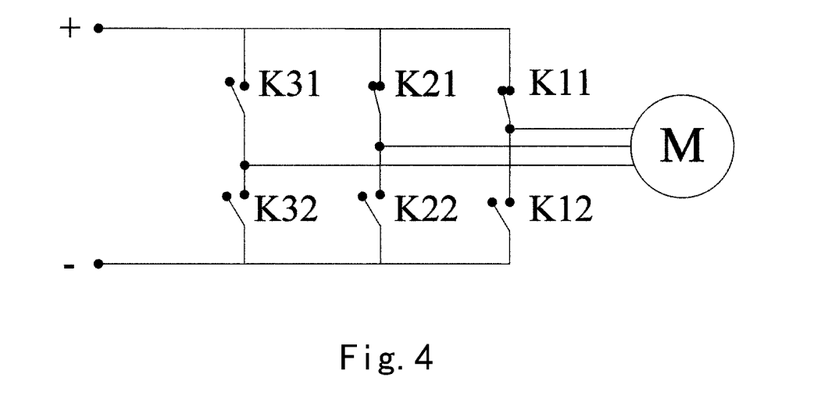
FIG. 4 is a schematic view showing a respective working state in controlling the compressor braking according to an embodiment of the present invention.
Figure 5:
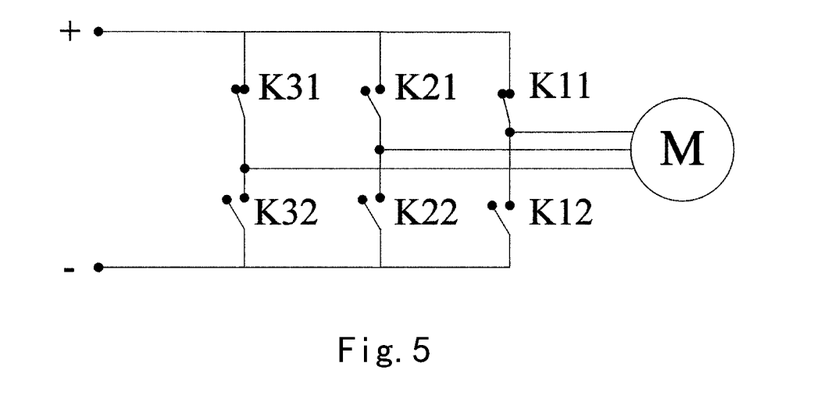
FIG. 5 is a schematic view showing a respective working state in controlling the compressor braking according to an embodiment of the present invention.
Figure 6:
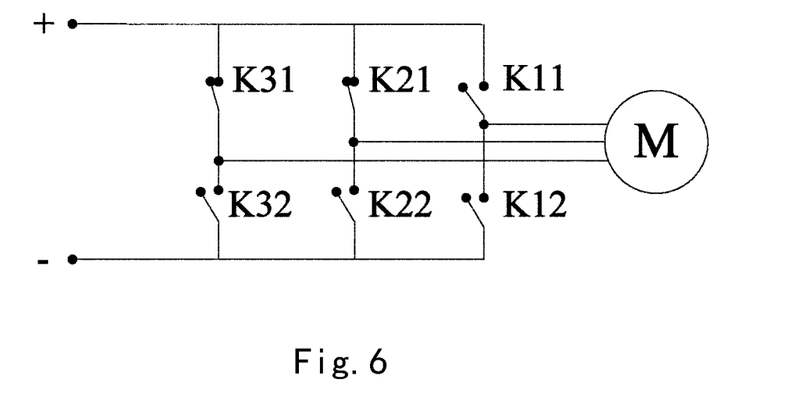
FIG. 6 is a schematic view showing a respective working state in controlling the compressor braking according to an embodiment of the present invention.
Figure 7:
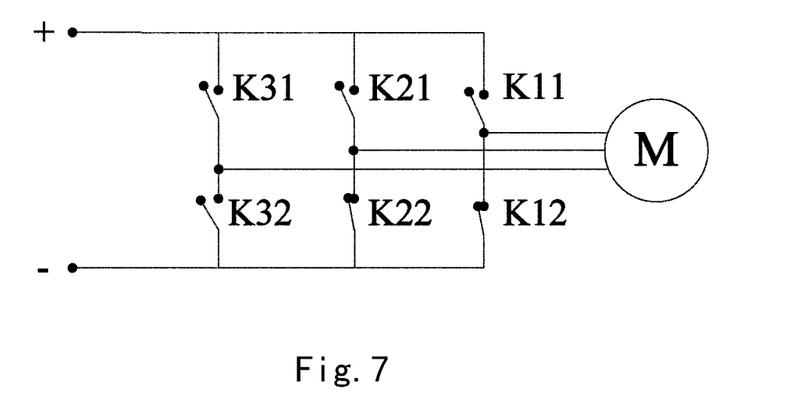
FIG. 7 is a schematic view showing a respective working state in controlling the compressor braking according to an embodiment of the present invention.
Figure 8:
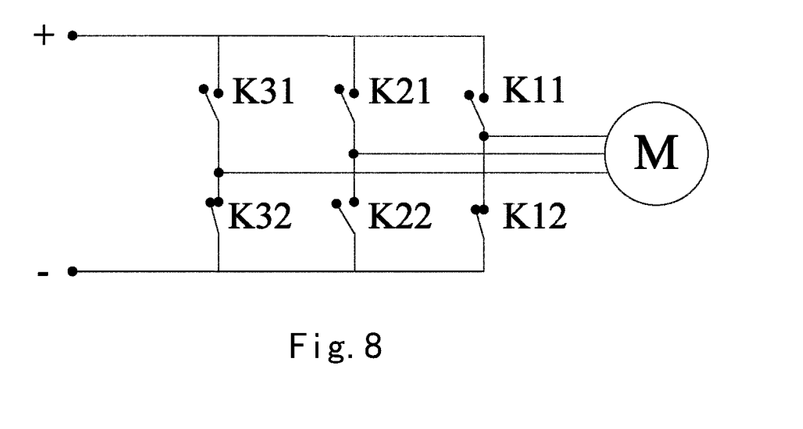
FIG. 8 is a schematic view showing a respective working state in controlling the compressor braking according to an embodiment of the present invention.
Figure 9:
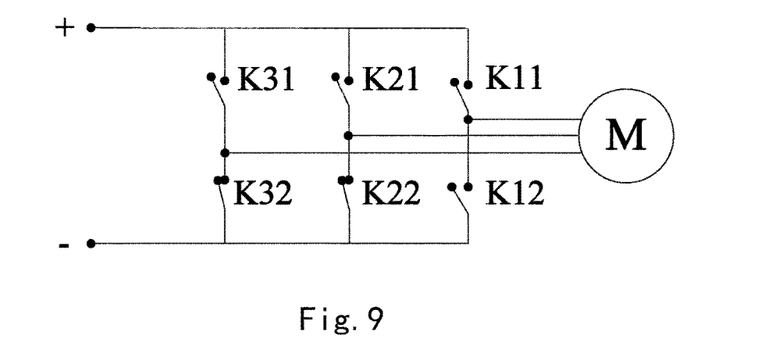
FIG. 9 is a schematic view showing a respective working state in controlling the compressor braking according to an embodiment of the present invention.

FIG. 3 is a schematic diagram showing the connection between a brake circuit and a motor according to an embodiment of the present invention. The three switching units may include three-phases of bridge arms, and each phase of bridge arm may include two switches in series, as shown in FIG. 3, K11 and K12 being connected in series, K21 and K22 being connected in series, K31 and K32 being connected in series, and the three connection points of the three-phases of bridge arms for connecting to the three-phases of windings of the motor 11 are respectively disposed between the two switches of each phase of bridge arm. For example, the connection point between the switches K11 and K12 is connected to one phase of winding of the motor 11. The controller 22 may be further configured to turn on two switches among the six switches that are on the same side of the three connection points, and to cyclically alternating the two switches for generating the braking torque in each turn. Since the switches on both sides of the connection point are respectively connected to the positive and negative poles of the DC power supply, the DC power supply and the compressor would be turned on if two switches among the six switches on different sides of the three connection points are turned on. Although braking can also be achieved in this manner, electric power would be consumed. In the present invention, two switches in the six switches that are located on the same side of the three connection points are turned on, such that the DC power supply is not turned on, but two phases of windings of the motor are short-circuited to generate braking torque so that braking is achieved and energy consumption is saved.

FIGS. 4 to 9 are schematic views showing respective operation states of the device controlling the braking of the compressor according to an embodiment of the present invention. The controller 22 turns on two switches of the six switches on the same side of the three connection points to short-circuit two phases of windings of the motor to generate braking torque, so that braking of the compressor is achieved. The two switches that are turned on each turn are cyclically alternated, and the two switches that are turned on each turn are the two switches on the same side of the three-phase bridge arms. Specifically, the controller 22 controls the three-phase bridge arms such that they cyclically alternate among the six operating states as shown in FIG. 4 to FIG. 9 in order to ensure the cyclical use of the six switches, and thus the abrasion is distributed evenly to the six switches and the overall service life of the three-phase bridge arms is improved.

It should be understood that FIG. 4 to FIG. 9 show only six working states of the three-phase bridge arms, and during the braking, it is possible to properly choose one of the working states or the alternating order of working states for the three-phase bridge arms according to the current working environment and other conditions. The invention does not define the selection of the working state or the alternating order of the working states. In addition, during the braking, a time period for the cyclical alternation can be properly chosen for the three-phase bridge arms according to the current working environment and other conditions, and the period of the cyclical alternation is not limited in the present invention.

In an embodiment of the invention, the switch may include one of the following types: a thyristor, a field effect transistor, an insulated gate bipolar transistor. However, it should be understood that the switch may be selected from different types according to the requirements of the actual application environment. The switch may be any one of a thyristor, a field effect transistor and an insulated gate bipolar transistor. The present invention does not limit the specific type and structure of the switch.

Figure 10:
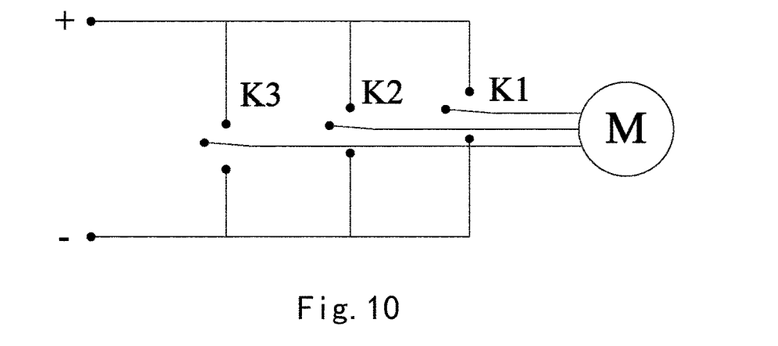
FIG. 10 is a schematic diagram of controlling compressor braking according to an embodiment of the present invention.

FIG. 10 is a schematic view of the structure of the device for controlling compressor braking according to an embodiment of the present invention. As shown in FIG. 10, the three switching units include three-phase bridge arms, each of which includes a single-pole double-throw switch; respective movable terminals of single-pole double-throw switches are respectively connected to the three-phase windings of the motor 11, and the two fixed terminals on both sides of a movable terminal are arranged on each of the bridge arms. Specifically, as shown in FIG. 10, the controller 22 controls two movable terminals of two single-pole double-throw switches among the three single-pole double-throw switches K1, K2, and K3, such that the two movable terminals are respectively electrically connected to the two fixed terminals on the same side of the two movable terminals. For example, the movable terminals of the switch K1 and K2 are electrically connected to the two fixed terminals on the same side of the movable terminals, respectively, so that the braking by short-circuiting two phases of windings of the motor 11 is achieved. The two terminals electrically connected each turn for generating the braking torque are cyclically alternated, such that the energy consumption generated during the braking process is distributed evenly to the three single-pole double-throw switches, and the overall service life of the three single-pole double-throw switches is improved.

This embodiment can also realize six working states similar to those shown in FIG. 4 to FIG. 9. However, it should be understood that the present embodiment does not limit the selection of any working state or the alternating order of the various working states, and the period for the cyclical alternating is also not limited.

Figure 11:
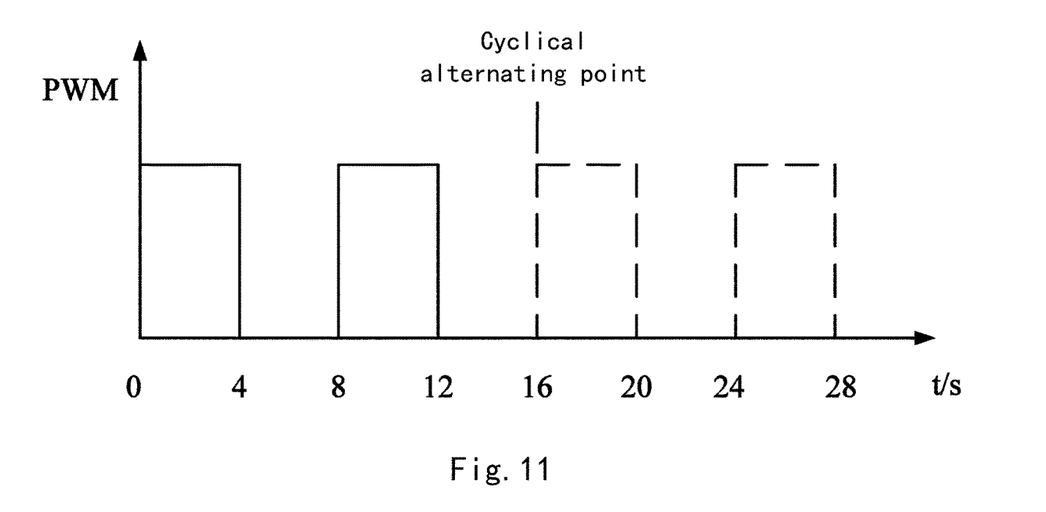
FIG. 11 is a schematic flow chart showing a cycle for alternating an operation state for controlling compressor braking according to an embodiment of the present invention.

In an embodiment of the invention, as shown in FIG. 11, the time period for cyclically alternating two of the three switching units is 16 seconds, that is, the two selected switching units are alternated every 16 seconds. The operation time of the two selected switching units is controlled by a PWM signal, and the period of the PWM signal is 8 seconds, and the duty ratio of the PWM signal is 50%. That is, in operation time controlled by the PWM, the two selected switching units actually are turned on for 4 seconds and turned off for 4 seconds in an cyclic manner until the 16th second when the time period for cyclical alternating is reached, and any two switch units are selected. However, it should be understood that although the description of the above embodiment involves the time period for cyclically alternating two of the three switching units, the period and the duty ratio of the PWM signal, these parameters can be adjusted according to actual application scenarios.

In an embodiment, the controller 22 is further configured to actuate two of the three switching units to short-circuit two phases of windings of the motor 11 when the rotational speed of the motor 11 is less than the preset rotational speed. That is, when the rotational speed of the motor 11 is greater than or equal to the preset rotational speed, the three switching units maintain the initial state, that is, all in the off states, and the brake device 2 does not get involved and does not brake the motor; only when the rotational speed of the motor 11 is less than the preset rotational speed, the controller 22 actuates two of the three switching units to short-circuit two phases of windings of the motor 11 to generate a braking force. By limiting the rotational speed of the motor, the brake device is prevented from generating excessive braking current due to excessive speed, and thus damage to the compressor and impact on other components due to the excessive braking current can be avoided, and the safety of the compressor during braking process is further improved. When the motor speed has not been decreased to the preset speed, other braking means can be used to reduce its rotational speed to a safe range, and then the braking device of the present invention can get involved and brake the motor. Other braking means may include idle speed reduction or feedback braking, etc.

In an embodiment, the controller 22 is configured to actuate two of the three switching units to short-circuit two phases of windings of the motor 11 when the current of the motor 11 is less than the preset current. When the current of the motor 11 is greater than or equal to the preset current, other means can be used to reduce the current to a safe range, and then the braking device 2 of the present invention can get involved and brake the motor; when the current of the motor 11 is less than the preset current, the controller 22 actuates two of the three switching units to implement braking. By limiting the current of the motor, the brake device is prevented from causing damages to the compressor and impacts on other components due to excessive current, thereby the safety of the compressor during braking process is further improved.

In an embodiment, the controller 22 is further configured to turn off the switches of the three-phase bridge arms that are currently on when the current of the motor 11 is greater than or equal to the preset current. The technical effect produced by this embodiment is basically the same as that of the previous embodiment, preventing the brake device from causing damages to the compressor and impacts on other components due to excessive current by the current limitation of the motor, thereby further improving the safety of the compressor during braking.

In an embodiment, the controller 22 is configured to the following: determine whether the current of the motor 11 is smaller than a preset current when the rotational speed of the motor 11 is lower than the preset rotational speed; if yes, turn on two of the three switching units to short-circuit two phases of windings of the motor 11. As can be seen, it is determined whether to start the braking process according to the current only when it is determined that the rotational speed of the motor is lower than the preset rotational speed. An excessive rotational speed of the motor usually leads to an excessive current of the motor during braking, thus the risk of overcurrent of the motor during braking can be effectively reduced by firstly determining that the motor speed is lower than the preset speed and then further determining the current of the motor is smaller than a present current.

In an embodiment, the three switching units may be three bridge arms on the inverter side of the frequency converter of the compressor, and the motor of the compressor may be a permanent magnet motor.

Figure 12:
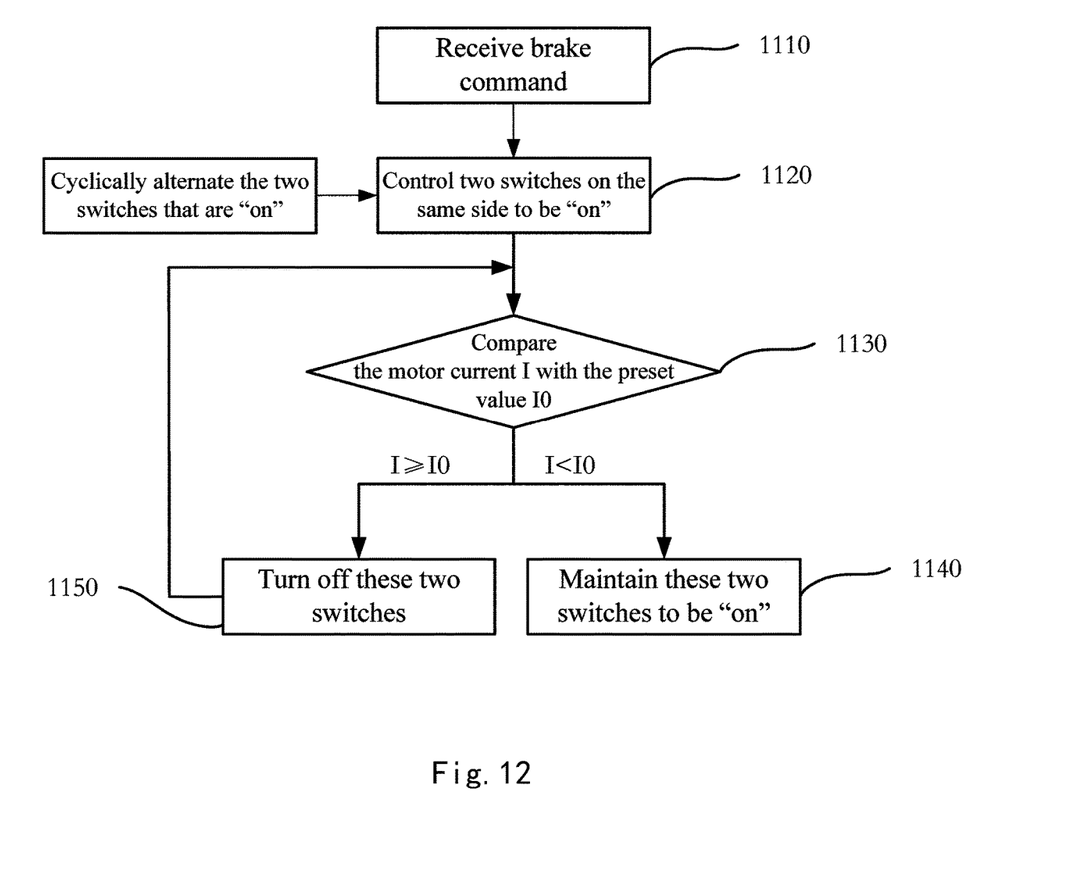
FIG. 12 is a schematic flow chart of a method for controlling compressor braking according to an embodiment of the present invention.

FIG. 12 is a schematic flow chart of a method for controlling compressor braking according to an embodiment of the present invention. This embodiment is described by an example which controls the six switches of three bridge arms on the side of the inverter of the frequency converter of the compressor. As shown in FIG. 12, the method includes the following specific steps.

Step 1110: Receive a brake instruction.

When a brake instruction from a control unit responsible for compressor start and stop, such as a power control unit or a switch control unit, is received and when it is determined to brake the compressor, the brake procedure begins.

Step 1120: Control two switches on the same side of the three-phase bridge arms to be "on".

Specifically, the braking procedure includes the following cycling sub-steps: controlling the two switches on the same side of the three-phase bridge arms (for example, the upper arm or the lower arm) to be "on", so that two phases of windings of the motor connected with the three-phase bridge arms are short-circuited to produce a braking torque, which converts the kinetic energy of the motor 11 into electrical energy, the energy is consumed on the rotor of the motor 11 and the braking is achieved.

It is possible to distribute the loss generated during the braking process to the three-phase bridge arms by turning on each two switches on the same side of the three-phase bridge arms in a periodical cyclic alternating manner, so that the overall life of the three-phase bridge arms is improved.

Step 1130: Compare the current I of the motor 11 with a preset value I0. If I<I0, step 1140 is performed, otherwise step 1150 is performed.

Step 1140: Maintain the above two switches to be "on". The two switches that are currently turned on are maintained at an "on" state until the time period condition for cyclically alternating the two switches is met, then the two switches that are turned on are alternated. It should be understood that one of the "on" switches before and after the alternation may be the same.

Step 1150: Turn off the two switches that are "on". The two switches that are currently "on" are turned off, and then step 1130 is executed until the motor 11's current I<I0, and when I<I0 step 1140 is performed.

When the current I of the motor 11 is greater than or equal to the preset current value I0, the two switches that are "on" are turned off, and the braking device stops braking. Only when the current I of the motor 11 is less than the preset current value I0, the controller 22 controls two switches on the same side of the three bridge arms to be "on" to achieve braking. By limiting the current of the motor 11, the brake device is prevented from causing damages to the compressor and impacts on other components due to the excessive current.

In an embodiment, the braking procedure may be executed only when the rotational speed of the motor 11 is lower than the preset rotational speed.

Figure 13:
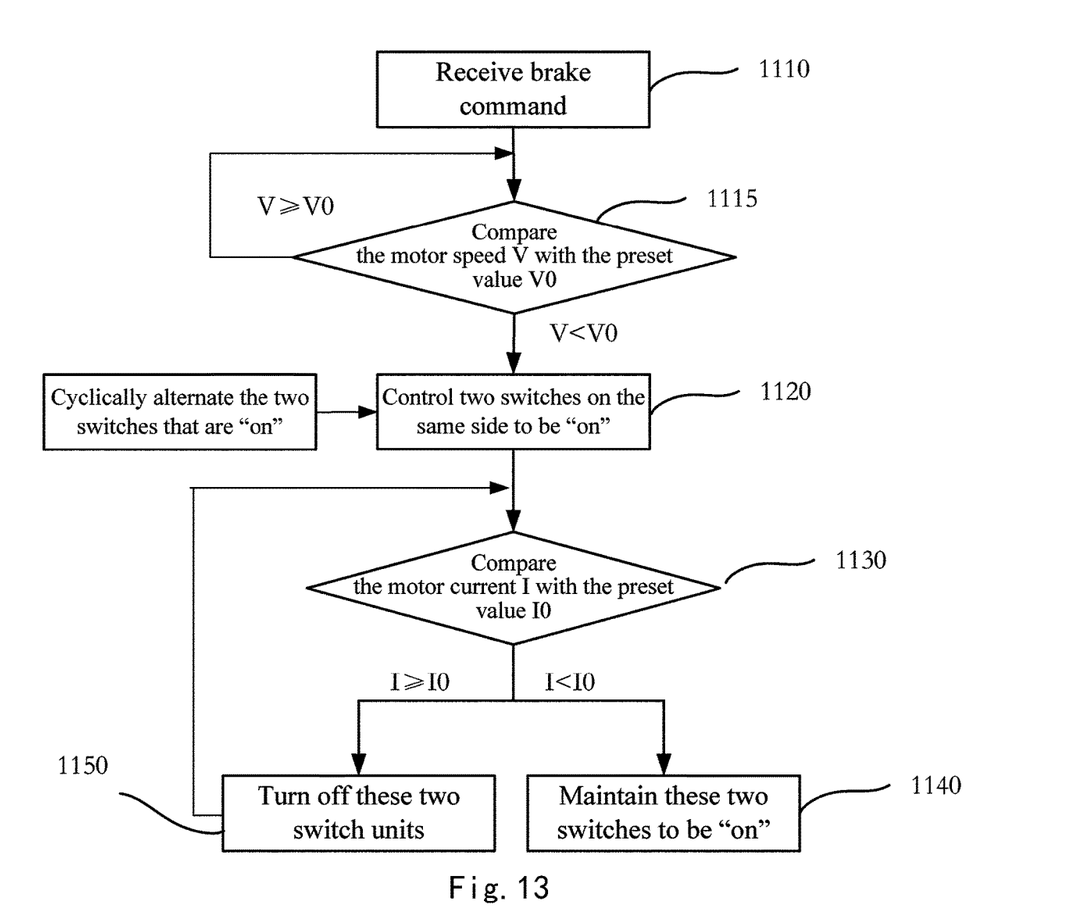
FIG. 13 is a schematic flow chart of a method for controlling compressor braking according to another embodiment of the present invention.

FIG. 13 is a schematic flow chart of a method for controlling compressor braking according to an embodiment of the present invention. As shown in FIG. 13, comparing to the embodiment of FIG. 12, the method further includes the following specific steps.

Step 1115: Compare the rotational speed V of the motor 11 with a preset value V0. If V<V0, go to step 1120, otherwise continue to compare the rotational speed of the motor 11 with the preset value.

Specifically, when a brake instruction is received, the controller 22 may firstly check the rotational speed of the motor 11. When the rotational speed V of the motor 11 is higher than or equal to the preset rotational speed value V0, the three-phase bridge arms maintain the initial state, i.e. the state where all the switches are "off", the braking device does not get involved and does not brake the motor. Only when the rotational speed V of the motor 11 is lower than the preset rotational speed value V0, the controller 22 actuates the two phases of bridge arms in the three-phase bridge arms to achieve braking. By limiting the rotational speed of the motor, the brake device is prevented from causing damages to the compressor and impacts on other components due to excessive braking current generated by excessive rotational speed, and thus the safety of the compressor during braking is further improved.

Further, the brake procedure is performed only when it is determined that the rotational speed of the motor 11 is less than the preset rotational speed, and during the execution of the brake procedure, it is further determined whether the current of the motor 11 is less than a preset current. The risk of overcurrent of the motor 11 can be effectively reduced during the braking process.

Figure 14:
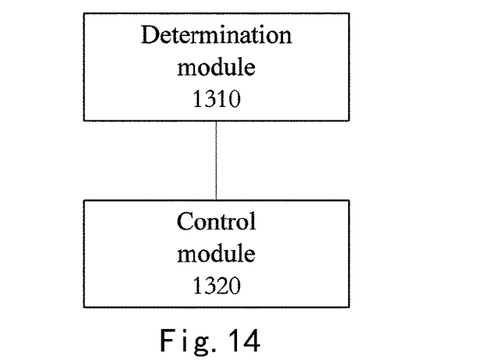
FIG. 14 is a schematic structural diagram of a controller according to an embodiment of the present invention.

FIG. 14 is a schematic diagram of the structure of a controller of frequency converter according to an embodiment of the present invention. As shown in FIG. 14, the controller 22 includes a determination module 1310 and a control module 1320. The determination module 1310, the control module 1320 and the brake circuit 21 of the compressor are electrically connected, and the brake circuit 21 is electrically connected with the motor 11 of the compressor. The brake circuit 21 includes three switching units K1, K2, K3, which are electrically connected to the three-phase windings of the motor 11 respectively. The controller 22 actuates two of the three switching units to short-circuit two phases of windings of the motor 11 to produce a braking torque, and cyclically alternates the two switching units used to generate the braking torque at each turn.

According to the embodiments of the present invention, two phases of windings of the motor are short circuited by actuating two of the three switching units to generate the braking torque, and the braking of the compressor is achieved without introducing a DC voltage, and the energy consumption is reduced. By cyclically alternating the two switching units actuated at each turn, the abrasion caused during the braking is distributed to each switching unit, which effectively improves the overall service life of the three switching units.

An embodiment of the present invention further provides a frequency converter. The frequency converter includes: a brake circuit and the above-mentioned controller. The brake circuit includes three switching units, and the three switching units are electrically connected to three phases of windings of the compressor motor respectively, and the controller actuates two of the three switching units to short-circuit two phases of windings of the motor.

Embodiments of the present invention also provide a variable speed compressor, including a compression unit, a permanent magnet motor and the above-described frequency converter. The motor is connected to the compression unit for driving the compression unit, and the brake circuit in the frequency converter includes three switching units which are electrically connected to three phases of windings of the motor respectively, and the controller in the frequency converter short-circuits two phases of windings of the motor by controlling the operation of two of the three switching units to achieve the braking of the compressor.

Two phases of windings of the motor are short-circuited to generate the braking torque by actuating two of the three switching units, the braking of the compressor is achieved without introducing a DC voltage, and the energy consumption is reduced. By cyclically alternating the two switching units actuated at each turn, the abrasion caused during braking is distributed among the three switching units, which effectively improves the overall service life of the three switching units.

An embodiment of the present invention further provides a computer device, including a storage device, a processor, and a computer program stored on the storage device and executed by the processor, and when the processor executes the computer program, the steps of the method for controlling the compressor braking as described in any of the preceding embodiments are implemented.

An embodiment of the present invention further provides a computer readable storage medium, on which a computer program is stored, when the computer program is executed by a processor, the steps of the method for controlling the compressor braking as described in any of the preceding embodiments are implemented. The computer storage medium can be any tangible medium, such as a floppy disk, a CD-ROM, a DVD, a hard drive, or even a network medium, etc.

It should be understood that although an implementation form of the embodiments of the present invention described above may be a computer program product, the method or devices of the embodiments of the present invention may be implemented as software, hardware, or a combination of software and hardware. The hardware portion can be implemented using dedicated logic; the software portion can be stored in storage devices and be executed by a suitable instruction execution system, such as a microprocessor or a dedicated design hardware. One of ordinary skilled in the art will understand that the methods and apparatus described above can be implemented using computer-executable instructions and/or included in processor control code, for example, code of this kind is provided on a carrier medium such as a magnetic disk, CD or DVD-ROM, or on a programmable storage device such as a read only storage device (firmware) or on a data carrier such as an carrier of optical or electronic signal. The methods and devices of the present invention may be implemented by hardware circuits, which include semiconductors such as very large scale integrated circuits, gate arrays, logic chips, transistors, etc., or programmable hardware devices such as field programmable gate arrays, programmable logic devices, etc.; they also can be implemented by software executable by various types of processors, or by a combination of the above-described hardware circuits and software, such as firmware.

It will be understood that although several modules or units of the device are mentioned in the above detailed description, such division is merely exemplary and not mandatory. In fact, according to exemplary embodiments of the present invention, the features and functions of the two or more modules/units described above may be implemented in one module/unit, and conversely, the features and functions of one module/unit described above can be further divided such that they are implemented in multiple modules/units. Moreover, some of the modules/units described above may be omitted in certain application scenarios.

The above is only embodiment of the present invention and is not intended to limit the present invention. Any modifications, equivalent substitutions, etc., which are within the principles of the present invention, should be included within the scope of the present invention.

What is claimed is:

1. A method for controlling compressor braking, wherein: determining to brake a compressor, a brake circuit comprising three switching units that are electrically connected to three phases of windings of a motor of the compressor respectively;
actuating two of the three switching units to short-circuit two phases of windings of the motor, wherein the method further comprises cyclically alternating the two switching units actuated in each turn among the three switching units.

2. The method of claim 1, wherein the cyclically alternating the two switching units actuated in each turn among the three switching units comprises:
cyclically controlling two switching units of the three switching units to operate in accordance within a preset time period.

3. The method of claim 2, wherein, the actuating two of the three switching units comprises:
controlling "on" time and "off" time of switches in the two switching units with a pulse width signal.

4. The method of claim 2, further comprising:
before determining to brake the compressor, determining that a brake instruction is received and that a speed of the motor is lower than a preset speed.

5. The method of claim 1, wherein said three switching units comprise three phase bridge arms, each phase of bridge arm comprises two switches in series, said three phases of bridge arms are connected with the three phases of windings of the motor at three connection points which are respectively disposed between the two switches of said each phase of bridge arm;
wherein, the actuating two of the three switching units comprises:
turning on two switches of the three switching units, the two switches being at the same side of the three connection points, wherein the other switches being remained off.

6. The method of claim 5, wherein, the actuating two of the three switching units comprises:
controlling "on" time and "off" time of switches in the two switching units with a pulse width signal.

7. The method of claim 5, further comprising:
before determining to brake the compressor, determining that a brake instruction is received and that a speed of the motor is lower than a preset speed.

8. The method of claim 1, wherein the three switching units comprise three phases of bridge arms, each phase of bridge arm comprises a single-pole double-throw switch, and a movable terminal of the single-pole double-throw switch is connected to a phase of windings of the motor, and two fixed terminals of said single-pole double-throw switch are located at both sides of the movable terminal;
wherein, the actuating two of the three switching units comprises:
electrically connecting two respective movable terminals of two single-pole double-throw switches among three single-pole double-throw switches respectively with two fixed terminals at the same side of the two movable terminals, wherein a movable terminal of the other single-pole double-throw switch maintains disconnected from a fixed terminal at the same side as the two fixed terminals connected with the two movable terminals.

9. The method of claim 8, wherein, the actuating two of the three switching units comprises:
controlling "on" time and "off" time of switches in the two switching units with a pulse width signal.

10. The method of claim 1, wherein, the actuating two of the three switching units comprises:
controlling "on" time and "off" time of switches in the two switching units with a pulse width signal.

11. The method of claim 1, further comprising:
before determining to brake the compressor, determining that a brake instruction is received and that a speed of the motor is lower than a preset speed.

12. The method of claim 1, further comprising:
before determining to brake the compressor, determining that a current of the motor is less than a preset current.

13. The method of claim 12, further comprising:
before determining that the current of the motor is less than the preset current, determining that a speed of the motor is lower than a preset speed.

14. The method of claim 13, further comprising:
turning off the three switching units when the current of the motor is greater than or equal to the preset current.

15. A frequency converter, wherein:
a brake circuit comprising three switching units electrically connected to three phases of windings of a motor of a compressor; and
a controller, configured to implement the method of claim 1.

16. A variable speed compressor, wherein:
a permanent magnet motor, and
the frequency converter of claim 15, wherein the brake circuit in said frequency converter is coupled to said permanent magnet motor for implementing control of the motor.

17. A method for controlling compressor braking, wherein:
determining to brake a compressor, a brake circuit comprising three switching units that are electrically connected to three phases of windings of a motor of the compressor respectively;
actuating two of the three switching units to short-circuit two phases of windings of the motor, wherein the three switching units comprise three phases of bridge arms, each phase of bridge arm comprises a single-pole double-throw switch, and a movable terminal of the single-pole double-throw switch is connected to a phase of windings of the motor, and two fixed terminals of said single-pole double-throw switch are located at both sides of the movable terminal;

wherein, the actuating two of the three switching units comprises:

electrically connecting two respective movable terminals of two single-pole double-throw switches among three single-pole double-throw switches respectively with two fixed terminals at the same side of the two movable terminals, wherein a movable terminal of the other single-pole double-throw switch maintains disconnected from a fixed terminal at the same side as the two fixed terminals connected with the two movable terminals.

18. A method for controlling compressor braking, wherein:
determining to brake a compressor, a brake circuit comprising three switching units that are electrically connected to three phases of windings of a motor of the compressor respectively;
actuating two of the three switching units to short-circuit two phases of windings of the motor.

* * * * *